(12) United States Patent
Hite

(10) Patent No.: US 6,364,723 B1
(45) Date of Patent: Apr. 2, 2002

(54) AIR BOAT WITH RETRACTABLE WHEELS FOR GROUND AND WATER TRAVEL

(76) Inventor: Loren Hite, P.O. Box 90708, Fairbanks, AK (US) 99708

( * ) Notice: Subject to any disclaimer, the term of this patent is extended or adjusted under 35 U.S.C. 154(b) by 0 days.

(21) Appl. No.: 09/649,026

(22) Filed: Aug. 28, 2000

(51) Int. Cl.$^7$ .................................................. B60F 3/00
(52) U.S. Cl. ....................................... 440/12.5; 440/37
(58) Field of Search ........................... 114/344; 440/37, 440/12.5, 12.51, 12.52, 12.53, 12.54

(56) References Cited

U.S. PATENT DOCUMENTS

| | | | |
|---|---|---|---|
| 2,169,946 A | | 8/1939 | Stone |
| 3,421,472 A | * | 1/1969 | Oberg |
| 3,831,211 A | | 8/1974 | Bustamante |
| 4,008,679 A | | 2/1977 | Bozzano |
| 4,175,636 A | * | 11/1979 | Broughton .................. 180/119 |
| 4,407,215 A | * | 10/1983 | Cyr ............................. 114/289 |
| 4,657,514 A | | 4/1987 | Chun ........................... 440/31 |
| 4,821,663 A | | 4/1989 | Schad ........................ 114/43 |
| 5,632,221 A | | 5/1997 | Trenne et al. ................ 114/270 |
| 5,769,021 A | | 6/1998 | Schad ......................... 114/270 |

FOREIGN PATENT DOCUMENTS

FR          2 677 901     * 12/1992

* cited by examiner

Primary Examiner—Sherman Basinger
(74) Attorney, Agent, or Firm—Tom Hamill, Jr.

(57) ABSTRACT

An air boat with retractable wheels is provided. The wheels are moved from the first position to the second position by a hydraulic system. The hydraulic system is actuated by the air boat user. The first wheel position is retracted, giving continuity to the hull, permitting the fan to drive the air boat over water. The second position is extended, bringing the wheels into contact with the ground, and permitting the fan to drive the air boat over the terrain of the land. The two wheels are in parallel relation with each other and are located in and under the hull of the boat at about the middle section of the air boat. The wheels, when in extended position, only breach the hull by a small amount as there is no propeller or rudder to clear when traveling over the land. The fan provides enough lift to prevent the bow and stern from coacting with the ground.

6 Claims, 5 Drawing Sheets

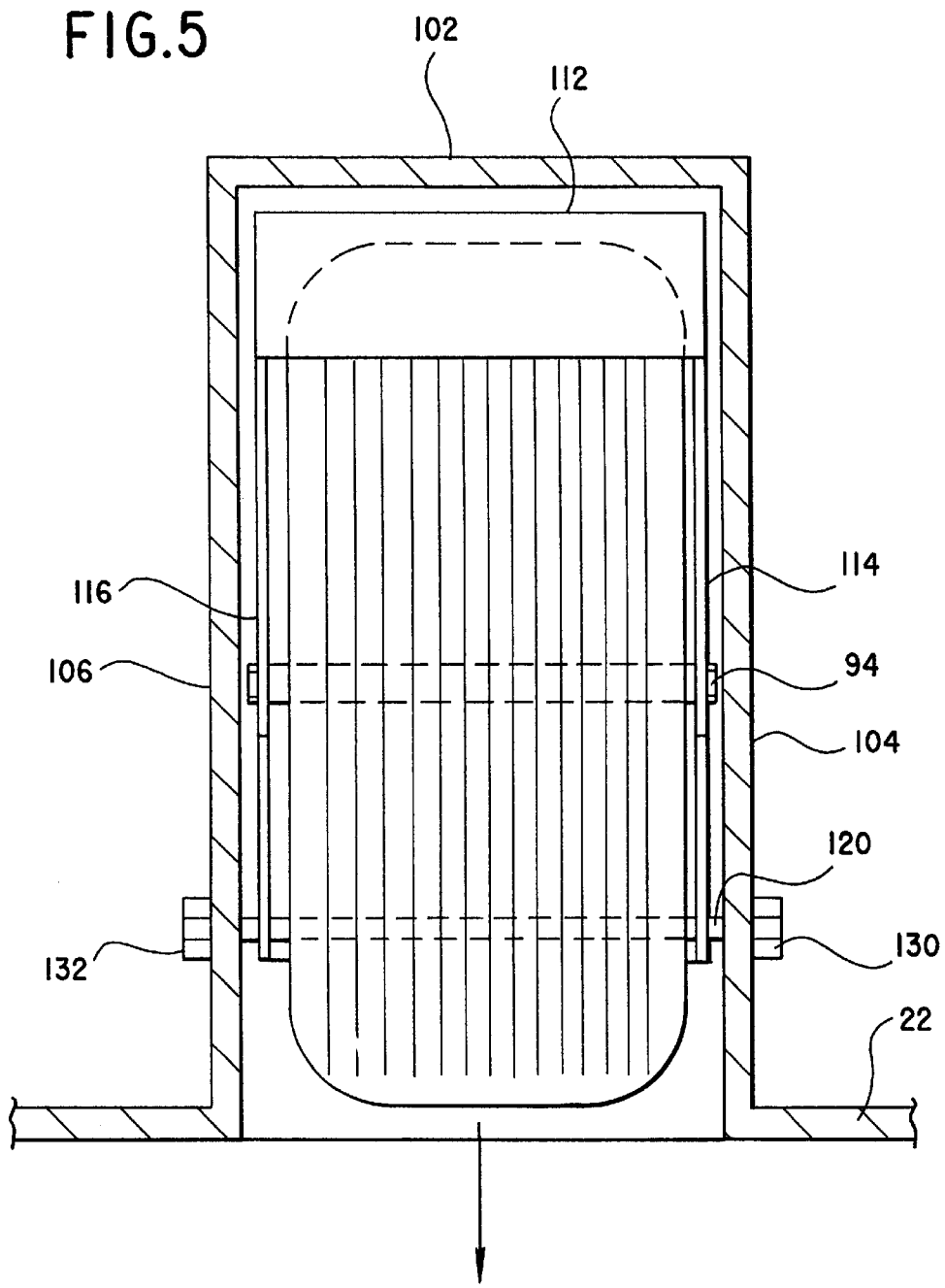

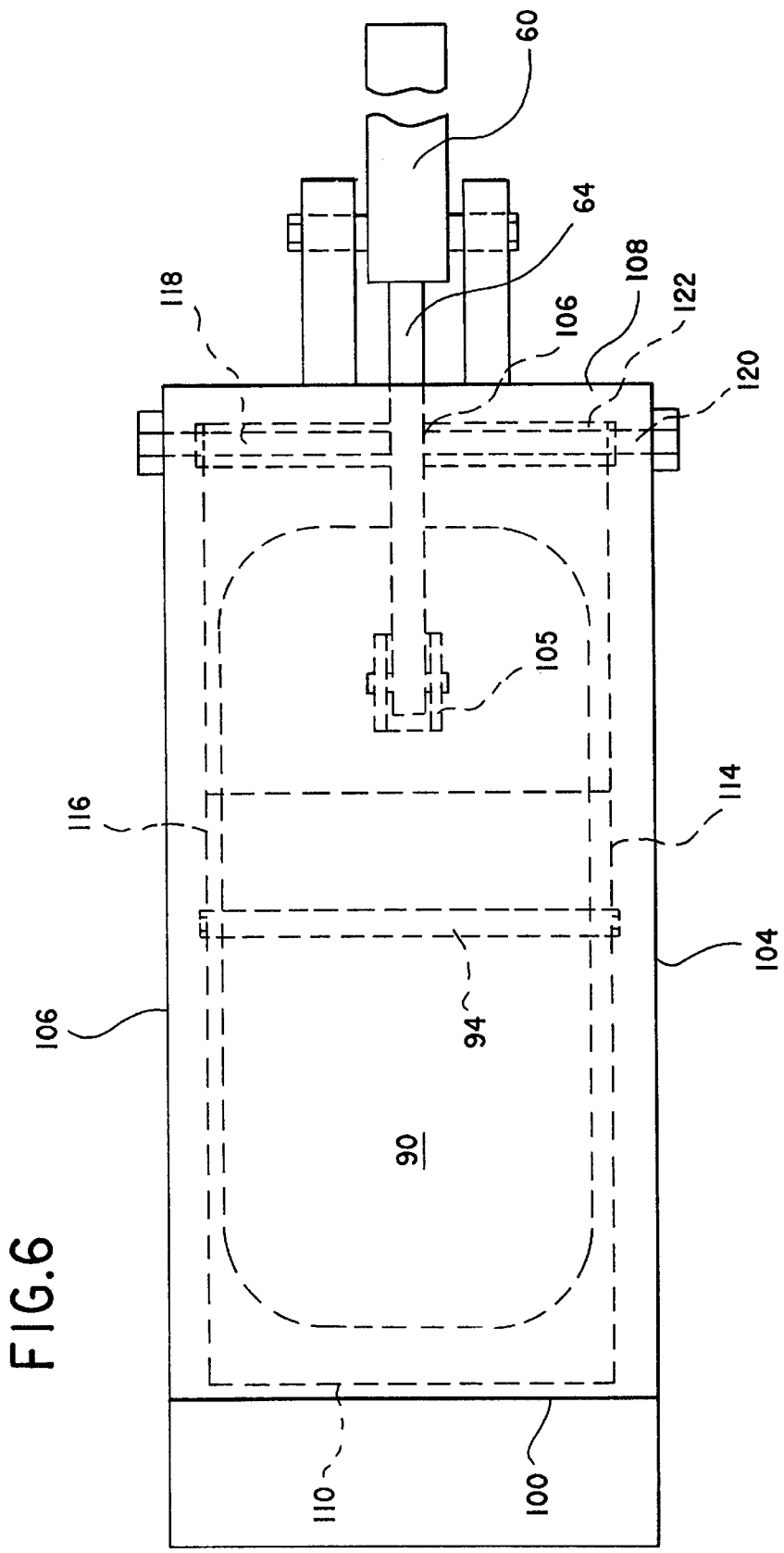

AIR BOAT WITH RETRACTABLE WHEELS FOR GROUND AND WATER TRAVEL

BACKGROUND OF THE INVENTION

1. Field of the Invention

The present invention relates generally to air boats, that is boats which are powered by a fan disposed on the stern, and more particularly, to an air boat with a pair of hydraulically deployable and retractable wheels, especially adapted to permit the air boat to travel over both land and water.

2. Description of the Prior Art

Multi-terrain vehicles which travel over both land and water are known in the art. U.S. Pat. No. 5,769,021 discloses an amphibious craft having a 2 wheels mounted on the stern and one wheel mounted on the bow. U.S. Pat. No. 5,632,221 also discloses an amphibious craft with two wheels mounted in the stern and one wheel mounted on the bow. U.S. Pat. No. 4,821,663 discloses an amphibious boat hull with 4 wheels, 2 proximal the side portions of the bow and two proximal the side portion of the stern.

Even though the foregoing body of prior art indicates it to be well known to use retractable wheels on an amphibious craft, the provision of providing those wheels to the right and the left of the midpoint of the centerline of the hull has not been contemplated. Nor does the prior art described above teach or suggest that the wheels be supported on an axle mounted in a fender, the fender being pivotably connected to a pair of wheel wells. The prior art further does not teach a pair of hydraulic pistons whose piston members are operatively connected to the fenders, and when extended, rotate the fender element deploying the wheels, and when they are retracted, rotate the fender element back into the hull, stowing the wheels. Other advantages of the present invention over the prior art also will be rendered evident.

SUMMARY OF THE INVENTION

The present invention provides an air boat with retractable wheels. The wheels are moved from the first position to the second position by a hydraulic system. The hydraulic system is actuated by the air boat user. The first wheel position is retracted, giving continuity to the hull, permitting the fan to drive the air boat over water. The second position is extended, bringing the wheels into contact with the ground, and permitting the fan to drive the air boat over the terrain of the land. The two wheels are in parallel relation with each other and are located generally under the midline of the air boat. The wheels, when in extended position, only breach the hull by a small amount as there is no propeller or rudder to clear when traveling over the land. The fan provides enough lift to prevent the bow and stern from coacting with the ground.

The air boat of the instant invention may be construed as a multi-terrain vehicle. The air boat has a hull with a bow, stern and centerline. A fan is located proximal the stern. The fan provides a propulsive force which is guided by at least one rudder. The propulsive force which propels the vehicle and the rudder would steer the airflow causing the air boat to turn to the right or the left. An operators chair is provided approximately amidship, the chair is proximal to the fan and rudder controls. Additionally, a control system for the wheels is provided. This control system permits the operator to deploy the wheels. This would allow the multi-terrain vehicle to be propelled over land, ice, snow, tundra, asphalt, concrete, gravel, other surfaces, and the like.

The wheels are mounted in fenders. The fenders are pivotably attached to the interior of a pair of wheel wells. The wheel wells are in parallel relation to each other and are disposed on the underside of the hull, to the right and the left of about the midpoint of the centerline. This is about midway between the bow and stern of the vehicle.

A hydraulic motor or pump is provided which has a first circuit and a second circuit. The first circuit connects the hydraulic motor to a first hydraulic piston. The second circuit connects the hydraulic motor to a second hydraulic piston. The first hydraulic piston is connected to the first fender, which supports the first wheel on an axle. The second hydraulic piston is connected to the second fender, which supports the second wheel on an axle.

When the multi-terrain vehicle is approaching land, the operator engages the hydraulic motor, which in turn energizes the first and second hydraulic circuits. This causes the first and second hydraulic piston to extend. The extension of the first and second hydraulic piston causes the first and second fenders to rotate about the pivotable connection in the first and second wheel well respectively. This has the effect of lowering a portion of the wheel below the surface of the hull and to a ground engaging position.

When the multi-terrain vehicle is approaching water, the operator disengages or reverses the hydraulic motor, which in turn causes the first and second hydraulic circuits to de-energize, retracting the piston portion on the first and second hydraulic pistons. This retraction of the first and second hydraulic pistons causes the first and second fenders to rotate in the opposite direction about the pivotable connection in the first and second wheel wells respectively. This has the effect of returning the wheels back into the wheel wells. In this retracted position, the first and second wheels do not depend below the surface of the hull.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide an air boat with retractable wheels which can travel over solid surfaces and liquid surfaces.

It is another object of the present invention to provide an air boat with a hull, stern, bow and centerline, where the wheels are located to the right and left of the centerline at approximately midway between the bow and the stern.

It is another object of the present invention to provide an air boat with a first and second wheel well, with a first and second fender pivotably secured within the first and second wheel well, with a first and second wheel mounted on a first and second axle, the first and second axles mounted to the first and second fenders.

It is another object of the present invention to provide a first and second hydraulic ram in fluid communication to a hydraulic pump, the first and second hydraulic ram connected to the first and second fenders, when engaged, the first and second hydraulic rams cause the first and second fenders to rotate, bringing the wheels below the line of the hull, permitting them to coact with the ground.

It is another object of the present invention to provide a control device in the hydraulic circuit to permit the operator to raise and lower the wheels.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 5 is a view taken along line 5—5 of FIG. 3.

FIG. 6 is a view taken along line 6—6 of FIG. 4.

DESCRIPTION OF THE PREFERRED EMBODIMENT

With reference now to the drawings, an air boat with retractable wheels embodying the principles and concepts of the present invention will be described.

Figure 1:
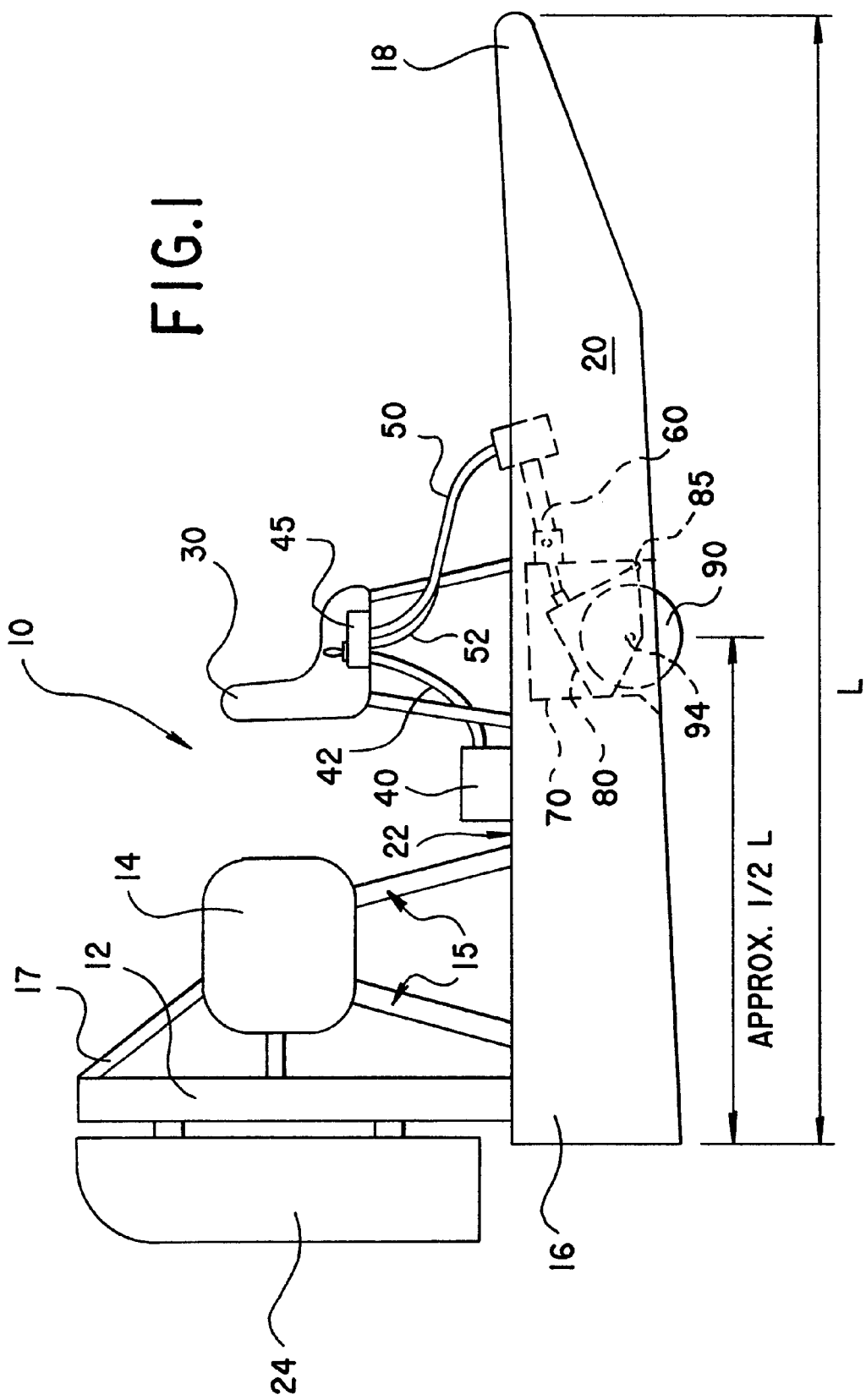
FIG. 1 is a side view showing the air boat with retractable wheels.
Figure 2:
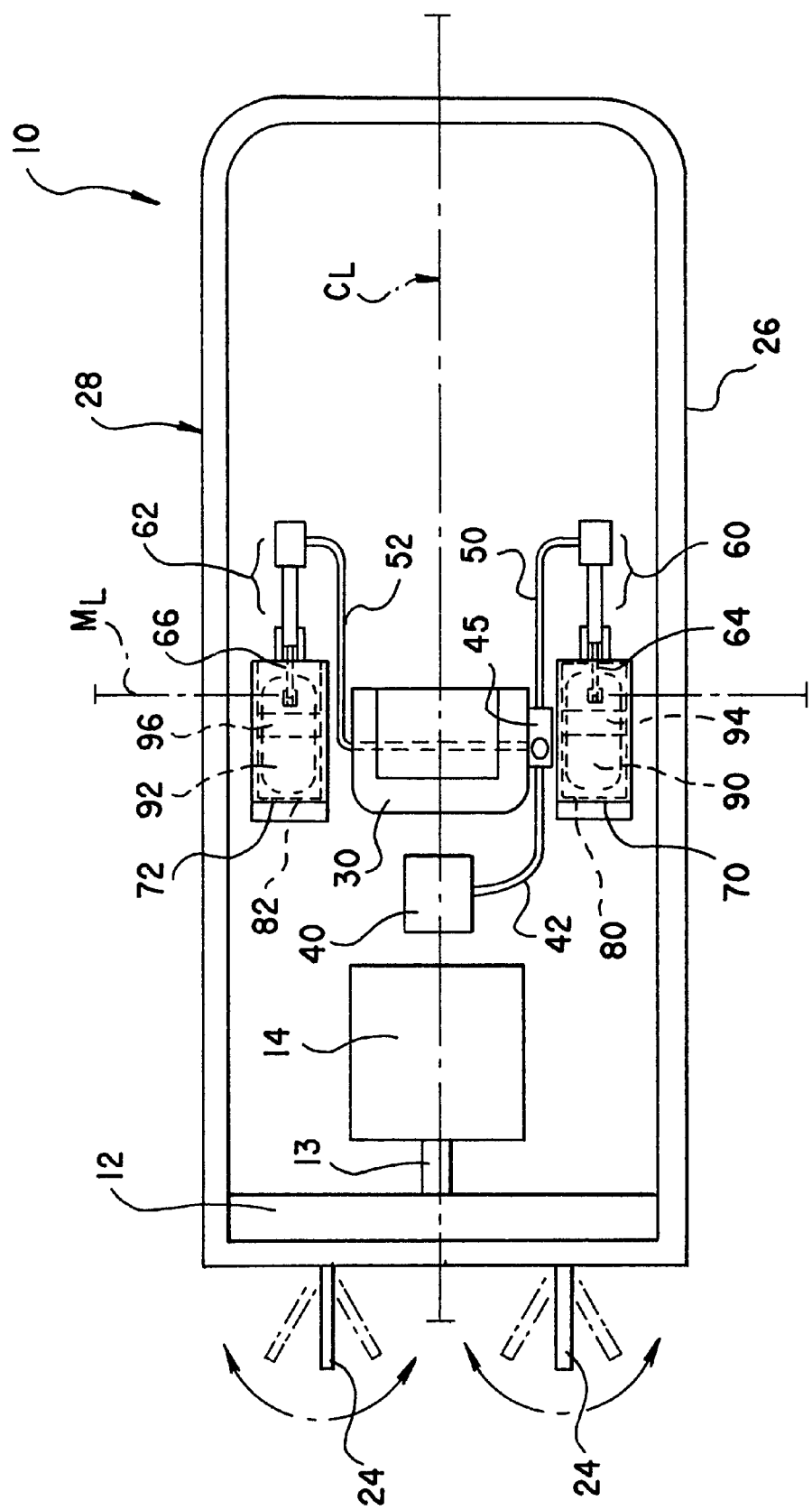
FIG. 2 is a top view with cut-away portions showing the hydraulic circuits for the air boat with retracable wheels.

Turning initially to FIGS. 1–2, there is shown the air boat with retractable wheels generally designated by reference numeral 10. The air boat 10 includes a stern (back) 16, a bow (front) 18, a hull 20, a right side 26 and a left side 28. A large fan 12 powered by an internal combustion engine 14 is provided. The fan 12 is mounted to the engine shaft 13 in a conventional manner. The fan 12 resides inside a protective cage to prevent injury. The fan 12 is mounted generally about the stern 16 on the deck 22 by standard mounting elements 15. Other conventional support structure 17 permits stability of the fan 12. A pair of air guides or rudders 24 are provided. A seat 30 for the operator is mounted on the deck 22 proximal the midline (ML) of the air boat 10. The fan 12, engine 14, and rudders 24 are controlled by the operator in a conventional manner and these control devices, such as a steering wheel are not shown.

As best seen in FIG. 2, the hull 20 includes a centerline (CL) and a midline (ML). The centerline (CL) is provided down the center of the air boat 10, intermediate the right side 26 and the left side 28 and is indicated by a dashed line. The midline (ML) is provided intermediate the stern 16 and the bow 18 and is indicated by a dashed line.

A hydraulic pump or motor 40 is provided. The hydraulic pump 40 is connected to a wheel extend/retract controller 45 located proximal the seat 30 of the operator by a hydraulic line 42. A first hydraulic circuit 50 and a second hydraulic circuit 52 are connected to the wheel controller 45. The first hydraulic circuit 50 is connected to a first hydraulic ram or piston 60. The second hydraulic circuit 92 is connected to a second hydraulic ram or piston 62. The first hydraulic ram or piston 60 includes a first extensible member 64. The second hydraulic ram or piston 62 includes a second extensible member 66. When the operator engages the wheel controller 45, the first extensible member 64 and the second extensible member 66 either extend or retract in unison, depending on the input instructions of the operator.

The first hydraulic piston 60 is located intermediate the centerline (CL) and the right side 26. The second hydraulic pistons 82 is located intermediate the centerline (CL) and the left side 28. The first hydraulic piston 60 is parallel to the second hydraulic piston 62.

A first wheel well 70 and a second wheel well 72 are provided. A first fender 80 and a second fender 82 are provided. A first wheel 90 and a second wheel 92 are provided.

The first wheel 90 is rotatably mounted on a first axle 94. The first axle 94 is mounted on the first fender 80. The first fender 80 is pivotably mounted by a first connector 85 in the first wheel well 70. The first extensible member 64 passes through the first wheel well 70 and is connected to the first fender 80. The second wheel 92 is rotatably mounted on a second axle 96. The second axle 96 is mounted on the second fender 82. The second fender 82 is pivotably mounted in the second wheel well 72 by a second connector (not shown, but identical to the first connector). The second extensible member 66 passes through the second wheel well 72 and is connected to the second fender 82. The descriptions of FIGS. 4 and 5 will show how the above structure operates, as well as will further define that structure.

Figure 3:
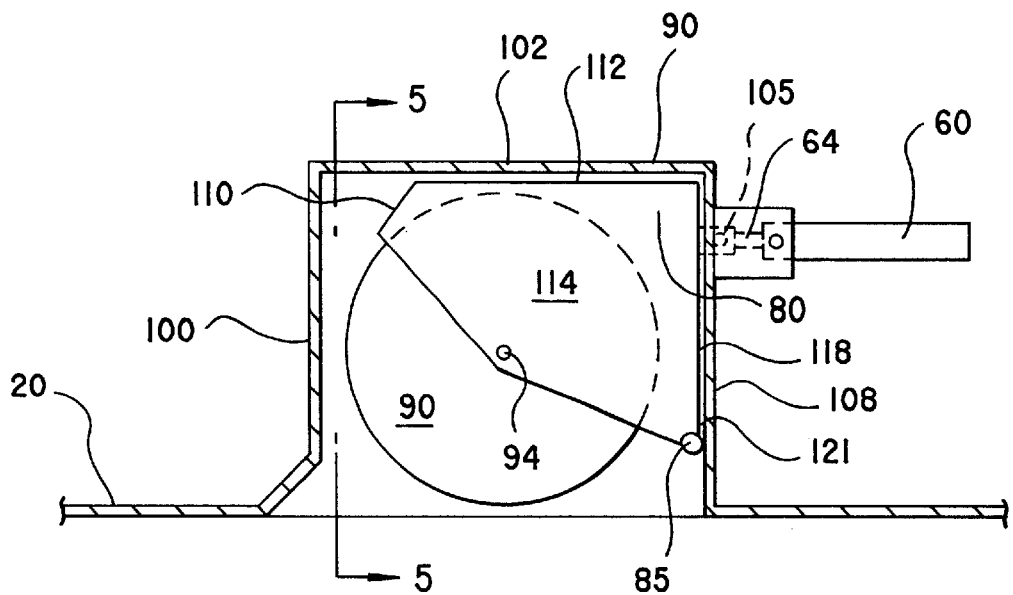
FIG. 3 is a cross-sectional view of one of the wheel wells, showing the wheel in the retracted position.

Referring now specifically to FIG. 3, we will describe the first (right) wheel 90 and associated support, extension and retraction structure. It is to be understood that the second (left) wheel 92 and associated support, extension and retraction structure is identical.

The first wheel well 90 includes a rear side wall 100, a top side wall 102, a right side wall 104, a left side wall 106 and a front side wall 108.

Figure 4:
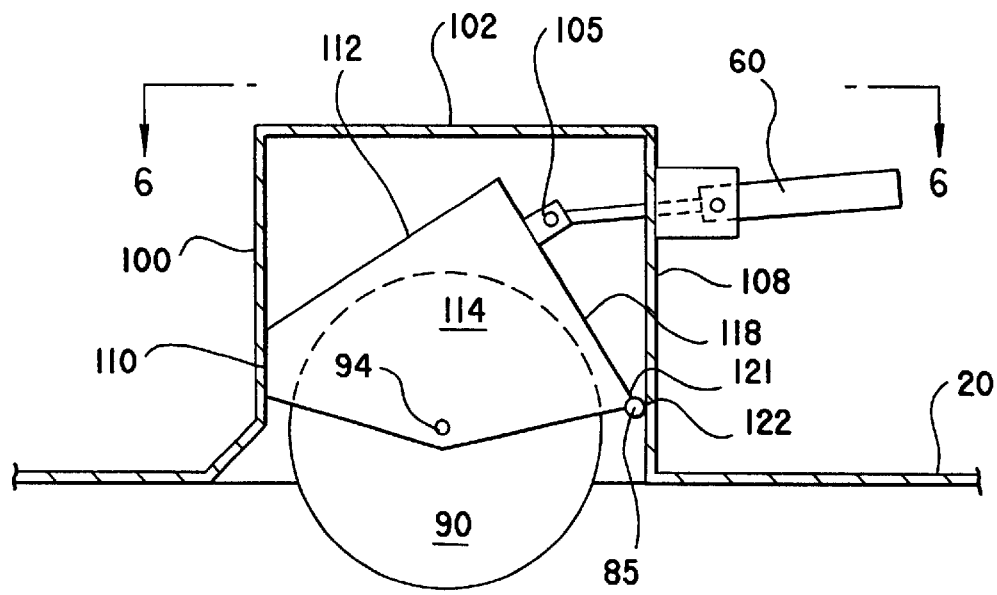
FIG. 4 is a cross-sectional view of one of the wheel wells, showing the wheel in the deployed or ground engaging position.

The first fender 80 includes a rear side wall 110, a top side wall 112, a right side wall 114, a left side wall 116, and a front side wall 118. This first fender 80 encloses the upper portion of the wheel as shown in FIG. 4.

The first wheel 90 is rotatably mounted on a first axle 94. The first axle 94 is connected to the first fender right side wall 114 and the first fender left side wall 116. This permits the first wheel 90 to freely rotate in the first fender 80. The first fender 80 would prevent dirt, debris, water and the like from entering the first wheel well 90.

The first extensible member 64 is connected to the first fender front side wall 118 by a first extensible member connection means 105. The first extensible member connection means 105 may include, but is not limited to, a c-shaped bracket with a retaining pin, welded to the first fender front side wall 118. Other known connection means may be employed. The first extensible member 64 passes through a first aperture 64 which permits the first extensible member 64 to extend and retract through the first wheel well front side wall 108.

The first connector 85 includes a pin 120 which is secured to the right wheel well right side wall 104 and the right wheel wall left side wall 106. A pin receiving portion 122 is formed on the lowermost portion 122 of the first fender front side wall 118. The pin 120 is secured to the right wheel right side wall 104 by a mechanical fastener 130. The pin 120 is secured to the right wheel left side wall 106 by a mechanical fastener 132. The pin 120 resides within the pin receiving portion 122, and will permit the first fender 80 to pivot about this point in the first wheel well 90.

When the operator toggles the wheel controller 45, the first wheel 90 and the second wheel 92 are deployed. The second wheel 92 is deployed identically to the first wheel 90 deployment. We will discuss the first wheel 90 deployment here. The hydraulic pump 40 energizes the first hydraulic circuit 50. This causes the first hydraulic piston 60 to extend the first extensible member 64. This pushes the first fender 80 in a rearward fashion, pivoting about the first connector 85 until the first fender rear side wall 110 comes in contact with the first wheel well rear side wall 100. At this point, wheel 90 is deployed and able to coact with a solid surface. When the operator wishes to retract the first wheel, the opposite steps occur, the first extensible member 64 retracts, bringing the first fender 80 back to its initial position, bringing the first wheel 90 back inside the hull 22.

Again, the description and operation of the second hydraulic circuit 52, second hydraulic piston 62, second extensible member 66, second wheel well 72 and associated construction of second wheel well 72, second fender 82 and associated construction of second fender 82, second mounting elements, second pivot points etc. are identical to those described above. When the operator engages the controller 45, both wheels retract and deploy simultaneously and in the same manner as is discussed for the first wheel 90.

It is apparent from the above that the present invention accomplishes all of the objectives set forth by providing an air boat with retractable wheels which can travel over solid surfaces and liquid surfaces, the air boat having a hull, stern, bow and centerline, where the wheels are located to the right and left of the centerline at approximately midway between the bow and the stern.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A multi-terrain vehicle for traveling over water, land and ice comprising:
   a hull having a bow, stern, and a centerline extending from the bow to the stern,
   said centerline having a midpoint,
   a first wheel, a second wheel, a first fender, a second fender, a first wheel well,
   and a second wheel well,
   said first fender enclosing an upper portion of said first wheel and said second fender enclosing an upper portion of said second wheel,
   said first wheel adapted to rotate in said first fender, said first fender pivotably attached to said first wheel well, said first fender having a first means to pivot from a first position to a second position,
   said second wheel adapted to rotate in said second fender, said second fender pivotably attached to said second wheel well, said second fender having a second means to pivot from a first position to a second position,
   said first wheel well and said second wheel well in parallel relation about said midpoint,
   said first wheel well having a first bottom opening through which when said first fender is pivoted to said second position, said first wheel is moved from a retracted to an extended position,
   said second wheel well having a second bottom opening through which when said second fender is pivoted to said second position, said second wheel is moved from a retracted to an extended position, whereby
   said first wheel and said second wheel may be retracted when said multi-terrain vehicle is traveling over water and said first wheel and said second wheel may be extended when said multi-terrain vehicle is traveling over land.

2. A multi-terrain vehicle for traveling over water, land and ice as claimed in claim 1 wherein said first means to pivot said first fender is a first hydraulic motor.

3. A multi-terrain vehicle for traveling over water, land and ice as claimed in claim 2 wherein said second means to pivot said second fender is a second hydraulic motor.

4. A multi-terrain vehicle for traveling over water, land and ice as claimed in claim 3 including propelling means comprising an air fan mounted to said stern of said hull for providing propulsive force when said vehicle travels over land, ice and water.

5. A multi-terrain vehicle for traveling over water, land and ice as claimed in claim 4 including a wheel control system adapted to be actuated by a user of the vehicle, said wheel control system causing said first hydraulic motor and said second hydraulic motor to extend or retract said wheels.

6. A multi-terrain vehicle for traveling over water, land or ice as claimed in claim 5 including a pair of rudders mounted behind said air fan, a rudder control system adapted to be actuated by a user of the vehicle, permitting the user to steer the vehicle over land, ice and water.

* * * * *